United States Patent
Ravindranath et al.

(10) Patent No.: US 12,020,024 B2
(45) Date of Patent: Jun. 25, 2024

(54) METHOD AND SYSTEM FOR IDENTIFYING TERMS FROM CRYPTIC FORMS OF VARIABLE NAMES IN PROGRAM CODE

(71) Applicant: Tata Consultancy Services Limited, Mumbai (IN)

(72) Inventors: Yogananda Ravindranath, Chennai (IN); Tamildurai Mehalingam, Chennai (IN); Reshinth Gnana Adithyan, Chennai (IN); Mounica Thamatam Reddy, Chennai (IN); Aditya Thuruvas Senthil, Chennai (IN); Shrayan Banerjee, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 140 days.

(21) Appl. No.: 17/810,452

(22) Filed: Jul. 1, 2022

(65) Prior Publication Data

US 2023/0057636 A1 Feb. 23, 2023

(30) Foreign Application Priority Data

Jul. 15, 2021 (IN) .............................. 202121031833

(51) Int. Cl.
*G06F 9/44* (2018.01)
*G06F 8/74* (2018.01)
(Continued)

(52) U.S. Cl.
CPC .............. *G06F 8/74* (2013.01); *G06F 40/274* (2020.01)

(58) Field of Classification Search
CPC ............. G06F 8/74; G06F 9/44; G06F 40/274
See application file for complete search history.

(56) References Cited

U.S. PATENT DOCUMENTS

| | | | |
|---|---|---|---|
| 11,101,037 B2 * | 8/2021 | Allen | G16H 40/67 |
| 11,341,327 B2 * | 5/2022 | Asano | G06F 40/247 |

(Continued)

FOREIGN PATENT DOCUMENTS

CN 112560484 A * 3/2021 ........... G06F 40/295

OTHER PUBLICATIONS

Rohan Bavishi, Context2Name: A Deep Learning-Based Approach to Infer Natural Variable Names from Usage Contexts, 2018, pp. 1-12. https://www.software-lab.org/publications/Context2Name_arXiv_1809.05193.pdf (Year: 2018).*

(Continued)

*Primary Examiner* — Mongbao Nguyen
(74) *Attorney, Agent, or Firm* — FINNEGAN, HENDERSON, FARABOW, GARRETT & DUNNER, LLP

(57) ABSTRACT

To understand/reverse engineer the code, knowledge of cryptic terms (variable names) present in the code is mandatory. The reverse engineering to understand the code is a very complex task which has infinite variations. A method and system for identifying meaningful terms in a domain context from a plurality of cryptic forms of a variable name in a program code is provided. A machine learning model that understands the cryptic form of a variable name and relates the co-occurring cryptic terms and expands them is provided. These expanded forms of cryptic terms directly aid in understanding of each term and its usage in a more accurate way. This knowledge is used in many downstream task of reverse engineering the program code. Linking of the multiple usages of the same variable and aims to reduce the gap of naming convention mismatches introduced by developers is provided.

8 Claims, 3 Drawing Sheets

(51) Int. Cl.
   *G06F 9/445*   (2018.01)
   *G06F 9/45*    (2006.01)
   *G06F 40/274*  (2020.01)

(56) References Cited

U.S. PATENT DOCUMENTS

| | | | |
|---|---|---|---|
| 11,494,557 B1* | 11/2022 | Riskin | G06F 40/40 |
| 2018/0068121 A1* | 3/2018 | Gray | G06F 8/74 |
| 2018/0196921 A1 | 7/2018 | Devarakonda et al. | |
| 2020/0104360 A1* | 4/2020 | Gahlot | G06N 3/08 |
| 2020/0151305 A1* | 5/2020 | Lam | G06F 8/41 |
| 2021/0295822 A1* | 9/2021 | Tomkins | G06F 40/30 |

OTHER PUBLICATIONS

Yanjie Jiang, Automatic and Accurate Expansion of Abbreviations in Parameters, 2020, pp. 732-746. https://ieeexplore.ieee.org/stamp/stamp.jsp?tp=&arnumber=8454758 (Year: 2020).*

Yanjie Jiang, Semantic Relation Based Expansion of Abbreviations, 2019, pp. 131-140. https://dl.acm.org/doi/pdf/10.1145/3338906.3338929 (Year: 2019).*

Trieu Thi Ly Ly et al., "Representing Context in Abbreviation Expansion Using Machine Learning Approach," 10th National Conference on Fundamental and Applied Information Technology Research, 2017, Research Gate, https://www.researchgate.net/publication/320869029_REPRESENTING_CONTEXT_IN_ABBREVIATION_EXPANSION_USING_MACHINE_LEARNING_APPROACH/link/5c53cad292851c22a39f69c9/download.

* cited by examiner

METHOD AND SYSTEM FOR IDENTIFYING TERMS FROM CRYPTIC FORMS OF VARIABLE NAMES IN PROGRAM CODE

PRIORITY CLAIM

This U.S. patent application claims priority under 35 U.S.C. § 119 to: Indian Patent Application No. 202121031833, filed on 15 Jul. 2021. The entire contents of the aforementioned application are incorporated herein by reference.

TECHNICAL FIELD

The disclosure herein generally relates to the field of code analysis, and, more particularly, to a method and system for identifying meaningful terms in a domain context from a plurality of cryptic forms of a variable name in a program code.

BACKGROUND

In the field of reverse engineering, there has been immense progress in the recent years and the advent of Machine Learning (ML) to understand a code has fueled the ideas further from the traditional ways. One such field in reverse engineering is the idea of understanding the intricacies of variable naming forms and its usage. Unlike the problem of understanding the syntax and the semantics of the code, this area of variable naming does not have any specific syntactic rules and is completely dependent on the developer. Though, certain enterprises might follow some naming conventions, the relationship between the variable name and its actual intention is uncertain.

Legacy codes have evolved over the years and maintained by multiple developers. Each maintenance change done by a new developer other than the owner on the code might introduce technical debt to the original architecture. Due to this, there might be many ways in which the same information is coded. While the requirement is always kept in mind while coding, the format of coding and naming of required variables is completely dependent on the developer. To understand/reverse engineer the code, knowledge of these cryptic terms (variable names) are required.

The reverse engineering to understand the code is a very complex task which has infinite variations. Based on the domain in which the code is written, there exist many variations in which a term is coded as a variable.

SUMMARY

Embodiments of the present disclosure present technological improvements as solutions to one or more of the above-mentioned technical problems recognized by the inventors in conventional systems. For example, in one embodiment, a system for identifying meaningful terms in a domain context from a plurality of cryptic forms of a variable name in a program code is provided. The system comprises a user interface, one or more hardware processors, and a memory. The user interface receives the program code as an input, wherein the program code comprises the plurality of cryptic forms of the variable name. The memory is in communication with the one or more hardware processors, wherein the one or more first hardware processors are configured to execute programmed instructions stored in the one or more first memories, to: extract the variable name from the program code using a parsing technique; segment the variable name into a major entity and a plurality of sub-entities using a plurality of segmentation techniques; obtain a plurality of expansions of the major entity and the plurality of expansions of sub-entities of the variable name using a plurality of multi model based abbreviation expansion techniques; regroup the obtained plurality of expansions of the major entity and the plurality of sub-entities which are co-occurring in the program code to obtain a plurality of suggestions of terms; perform a co-occurrence resolution of the plurality of suggested terms to check whether the plurality of suggested terms make sense in the program code, wherein the co-occurrence resolution results in the generation of one or more expansions of the terms; and perform a conflict resolution if there are more than one expansion of the terms, to identify meaningful term of the abbreviation of the variable name according to a current context.

In another aspect, a method for identifying meaningful terms in a domain context from a plurality of cryptic forms of a variable name in a program code is provided. Initially, the program code is received as an input via a user interface. The program code comprises the plurality of cryptic forms of the variable name. Further, the variable name is extracted from the program code using a parsing technique. In the next step, the variable name is segmented into a major entity and a plurality of sub-entities using a plurality of segmentation techniques. Further, a plurality of expansions of the major entity and the plurality of expansions of sub-entities of the variable name is obtained using a plurality of multi model based abbreviation expansion techniques. In the next step, the obtained plurality of expansions of the major entity and the plurality of sub-entities which are co-occurring in the program code are regrouped to obtain a plurality of suggestions of terms. In the next step, a co-occurrence resolution of the plurality of suggested terms is performed to check whether the plurality of suggested terms make sense in the program code, wherein the co-occurrence resolution results in the generation of one or more expansions of the terms. And finally, a conflict resolution is performed if there are more than one expansion of the terms, to identify meaningful term of the abbreviation of the variable name according to a current context.

In yet another aspect, there are provided one or more non-transitory machine-readable information storage mediums comprising one or more instructions which when executed by one or more hardware processors cause identifying meaningful terms in a domain context from a plurality of cryptic forms of a variable name in a program code is provided. Initially, the program code is received as an input via a user interface. The program code comprises the plurality of cryptic forms of the variable name. Further, the variable name is extracted from the program code using a parsing technique. In the next step, the variable name is segmented into a major entity and a plurality of sub-entities using a plurality of segmentation techniques. Further, a plurality of expansions of the major entity and the plurality of expansions of sub-entities of the variable name is obtained using a plurality of multi model based abbreviation expansion techniques. In the next step, the obtained plurality of expansions of the major entity and the plurality of sub-entities which are co-occurring in the program code are regrouped to obtain a plurality of suggestions of terms. In the next step, a co-occurrence resolution of the plurality of suggested terms is performed to check whether the plurality of suggested terms make sense in the program code, wherein the co-occurrence resolution results in the generation of one or more expansions of the terms. And finally, a conflict resolution is performed if there are more than one expansion of the terms, to identify meaningful term of the abbreviation of the variable name according to a current context.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Legacy codes have evolved over the years and maintained by multiple developers. Each maintenance change done by a new developer other than the owner on the code might introduce technical debt to the original architecture. Due to this, there might be many ways in which the same information is coded. To understand/reverse engineer the code, knowledge of these cryptic terms (variable names) are required.

The reverse engineering to understand the code is a very complex task which has infinite variations. For instance, the variable for a term "Customer Identifier" can be created as CUST-ID, CUSTOMER-ID, CUST-IDENT and "n" number of different variations based on the programmer. Likewise, based on the domain in which the code is written, there exist many variations in which a term is coded as a variable. A deterministic logical program approach to solve this problem, will incur a lot of time and effort for coding and is domain dependent with variations when the domain changes.

The present disclosure provides a method and system for identifying meaningful terms in a domain context from a plurality of cryptic forms of a variable name in a program code. The present disclosure provides a machine learning (ML) model that understands the cryptic form of a variable name and relates the co-occurring cryptic terms and expands them. These expanded forms of cryptic terms directly aid in understanding of each term and its usage in a more accurate way. This knowledge can be used in any downstream task of reverse engineering the program code.

The present disclosure aims to extract as much as information from the variable names which are generally cryptic in nature. This disclosure links the multiple usages of the same variable and aims to reduce the gap of naming convention mismatches introduced by developers. From the cryptic name, it expands and thus identifies the possible purpose of the variable when it was created. This enables to have a view of the information that it holds and in turn helps in the overall understanding and the reverse engineering of the code.

Figure 1:
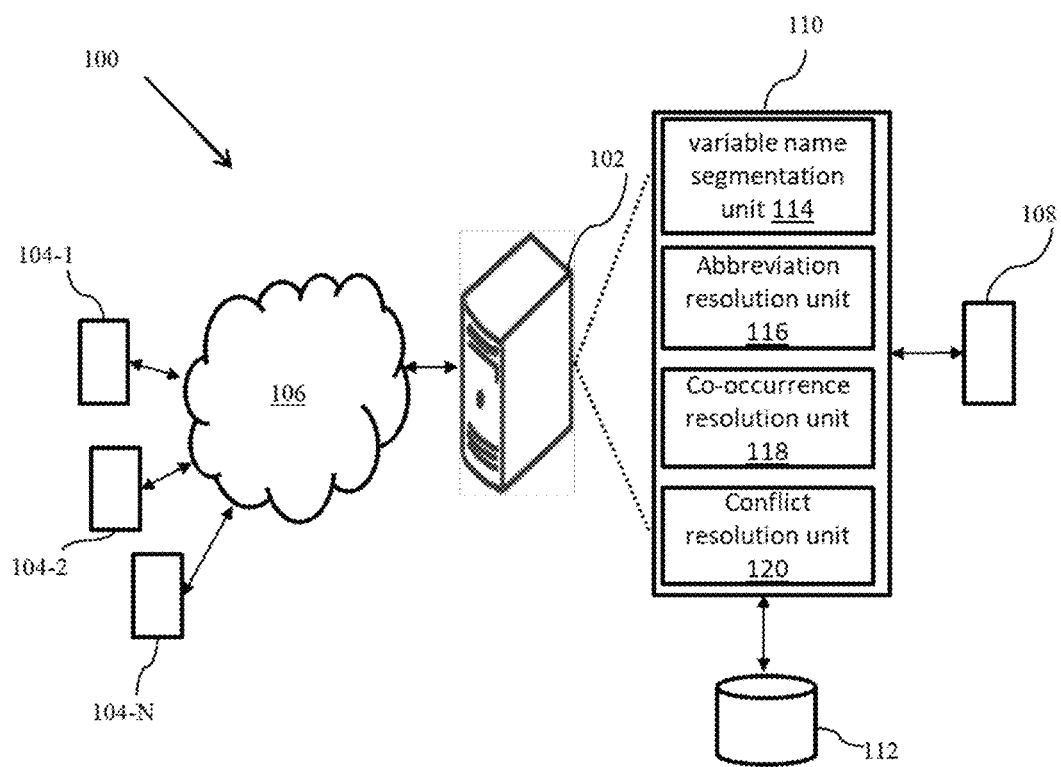
FIG. 1 illustrates a block diagram of a system for identifying meaningful terms in a domain context from a plurality of cryptic forms of a variable name in a program code according to some embodiments of the present disclosure.
Figure 2:
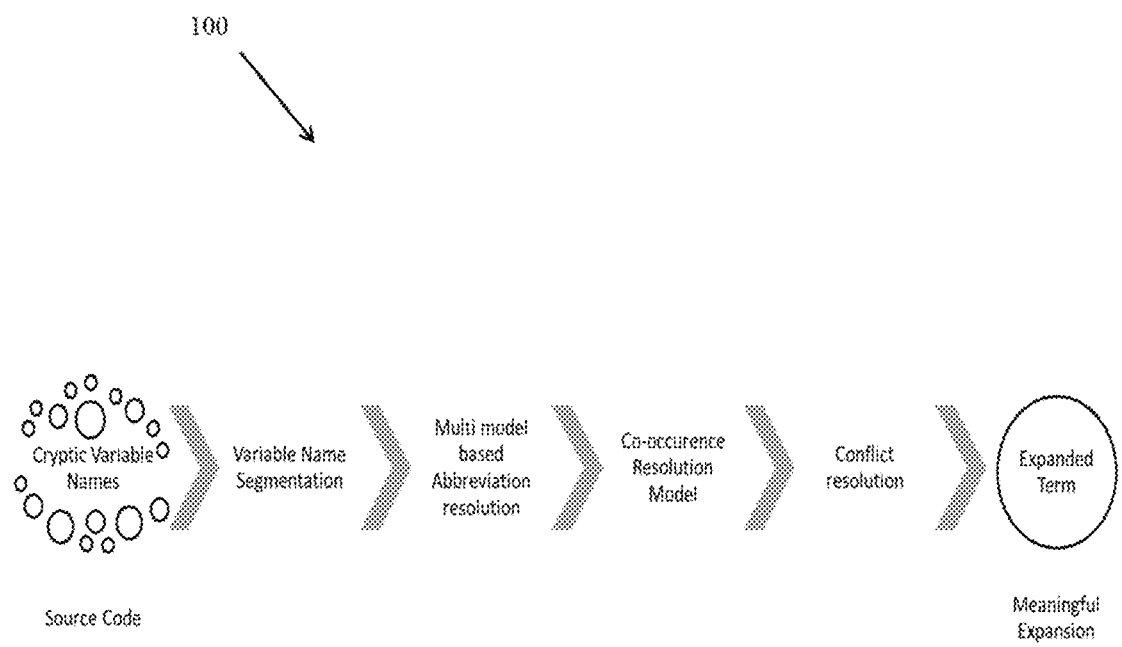
FIG. 2 is a functional flow diagram of the system of FIG. 1 for identifying meaningful terms in a domain context from a plurality of cryptic forms of a variable name in a program code according to some embodiments of the present disclosure.
Figure 3:
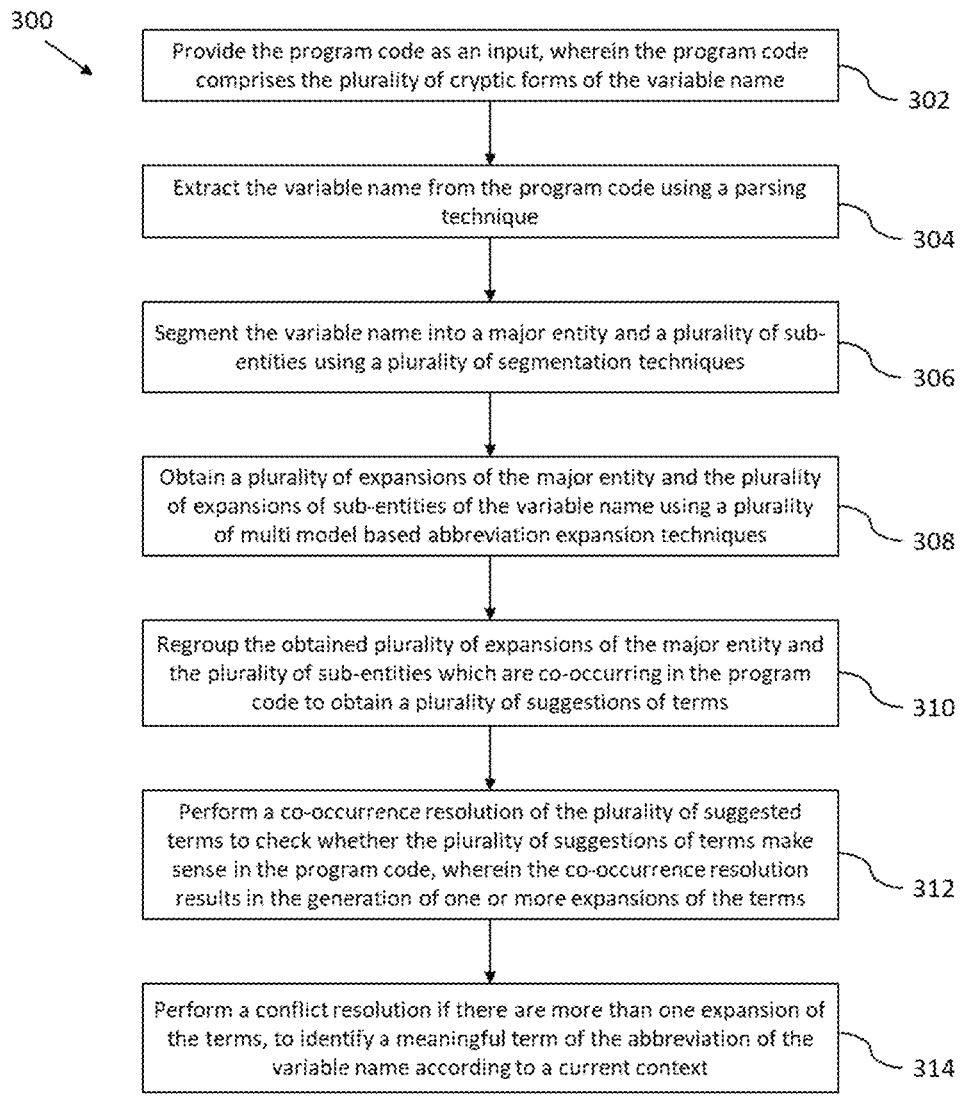
FIG. 3 a flow chart illustrating a method for identifying meaningful terms in the domain context from the plurality of cryptic forms of the variable name in the program code accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates a network diagram of a system 100 for identifying meaningful terms in the domain context from the plurality of cryptic forms of the variable name in the program code. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further variable name segmentation unit comprises a plurality of modules. The plurality of modules is configured to perform various functions. The plurality of modules comprises a variable name segmentation unit 114, an abbreviation resolution unit 116, a co-occurrence resolution unit 118, and a conflict resolution unit 120.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, a block diagram of the system 100 for identifying meaningful terms in the domain context from the plurality of cryptic forms of the variable name in the program code shown in FIG. 1. The system 100 is utilizing four main units, i.e., variable name segmentation, multi-model based abbreviation resolution, co-occurrence resolution model and conflict resolution as shown in the functional block diagram of FIG. 2.

According to an embodiment of the disclosure, the system 100 is configured to receive the program code as the input and gives the expanded terms as the output. These expanded terms are the meaningful terms. All the variables in the code are interpreted to create any meaningful outcome by applying reverse engineering on the code. The program code comprises the plurality of cryptic forms of the variable name. The system 100 is also configured to extract the variable name from the program code using the parsing techniques.

According to an embodiment of the disclosure, the system 100 comprises the variable name segmentation unit 114. The variable name segmentation unit 114 is configured to segment the variable name into a major entity and a plurality of sub-entities using a plurality of segmentation techniques. Most of the variable names which are place holders of an entity in a requirement often have a major entity with many related and associated sub entities. For instance, CUST-ID, CUS-TYPE, ACCT-NO, ACC-HLD-NAME, ACCT-ID etc. can be used for writing CUSTOMER ID or ACCOUNT ID. In all these examples, we can notice that CUSTOMER and ACCOUNT are two major entities and ID, TYPE, NUMBER, NAME etc. are its corresponding sub entities. Thus, to understand the complete term, terms are split into the corresponding sub terms to understand the different entities that are present in the variable term. This step of Variable Name segmentation is done with based predominant styles used in variable naming as mentioned below, though it should be appreciated that use of any other method is well within the scope of this disclosure:

Based on hyphen: Splitting is done based on the hyphen present between the sub-terms. For example, SOI-TYPE: Splitting of the terms SOI and TYPE based on the hyphen Based on underscore: Splitting is done based on the underscore present between the sub-terms. For example, POLICY_DENT is split into POLICY and DENT.

Based on Case: Splitting is done based on the case of the alphabets present in the sub-terms. For example, getCustomerId is split into GET, CUSTOMER and ID A plurality of word segmentation techniques can also be used to split the sub-terms. For example, ACID, CUID: AC and ID where in the AC expands to ACCOUNT and CU, ID wherein CU expands to CUSTOMER.

According to an embodiment of the disclosure, one of the word segmentation techniques comprises mapping the comment to the code and obtaining the expansion of the term with respect to that. The source code comments are classified into not useful comments category and useful category such as variable based comments, version based comments, overview based comments etc. These comments often have the expansions of variables directly or indirectly in them. This information is extracted to expand the variables. A couple of methods to attain the same is mentioned as below which is used to create an initial repository of variable and possible expansions:

Pattern analysis—a configurable external pattern list is used which goes through the list of comments and extracts variable-expansion pairs. For example, comments with semicolons or hyphens are likely to have an LHS RHS relation with them. This is used to populate the variable and expansion lists. For example,

PR-ACC-ID: Payer Account ID
PE-ACC-ID: Payee Account ID
POL-NO-EXP—Policy Number Expiry 2. Variable based comments and scope based comments (existing just above or inside function code blocks) obtained are preprocessed to get a list of entities. These expanded word entities in the comments are then matched with possible candidate variables in the source code. For example, #Function to calculate compound interest provided the account ID for one year and compensate with previous year total CMP-INTR.
FETCH ACC-ID FROM TABLE-1.
...
..
>CMP-INTR: compound interest (from comment) and not compensate interest (which is also there in comment)

This repo of extracted variable-expansions will serve as an initial set for the further processes explained in the disclosure.

According to an embodiment of the disclosure, the system 100 comprises the abbreviation resolution unit 116. The abbreviation resolution unit 116 is configured to obtain a plurality of expansions of the major entity and the plurality of expansions of sub-entities of the variable name using a plurality of multi model based abbreviation expansion techniques. The multi-model based abbreviation resolution is the core part of the present disclosure where the actual resolution happens based on multiple ML models. Each model is designed to mimic the behavior of a developer when the model tries to create the variable name for a specific requirement. Various variable name can be created based on one of the following methods:

Syllable based abbreviation prediction
First n term abbreviation
Insignificant character remover
Based on variable relations with other variables (and its naming)
Acronym identification and expansion
Random generator Each of the above method based model is based on a training data. In the syllable based abbreviation prediction, the core essence of this disclosure and the related algorithms/ML models is to mimic the core behavior of the programmer who had created the cryptic variable and recreate the same. In this regard, a word being understood on the basis of a syllable is a very important step. It can be understood with the help of an example, CUSTOMER: The term CUSTOMER has 3 syllables in which the first syllable is CUS. In more than 80 of the cases, while trying to abbreviate the term CUSTOMER developers tend to use CUS. Likewise, there are many other variations which are used in identifying the business term through syllable analysis. 1. Splitting by syllables and taking the first character 2. Sometimes retaining the last two characters 3. Decision on repeating characters 4. Retaining vowels if present in the end 5. Handling words that cannot be split into separate syllables (smaller words). 6. First letter of each syllable in a word. Though it should be appreciated that it is not limited to only above six variations, business term can also be identified in various other ways.

In the first n term abbreviation method, the model is a feed forward neural network which determines the value of n based on the input and return a variable abbreviation. There is a supervised set of terms and abbreviation combination which would help it find the correct value of n and hence return the corresponding abbreviation. For example, APPLICATION: APP, APPROXIMATE: APPR, a deterministic logic with n defined as 3 would return, APP in both the cases.

In the insignificant character remover method, the model is a feed forward neural network which will remove all the insignificant characters in the word like the vowels, suffixed numbers etc. and create the abbreviation. The intelligence is in the training of what is the insignificant vowel as compared to all the vowels which can be done through any deterministic algorithms. For example, AMOUNT1: AMNT, A is a vowel which is retained, O, U are vowels which are considered insignificant and removed, 1 is an insignificant suffix that is removed.

In the method based on variable relations with other variables (and its naming), the variables to which a current variable is related to provides enough information about the variable itself. Even if the model is not able to decode the current cryptic term, based on the related terms the meaning of the current variable can be deciphered. There are more than 100 possible variations that's being considered here. Following are the possible variations:

1. degree of modification (direct) in assignments
2. degree of usage (direct) in assignments
3. degree of modification (indirect)—in assignments
4. degree of usage (indirect)—in assignments
5. degree of association with FILE—Inbound
6. degree of association with DB—Inbound
7. degree of association with SCREEN—Inbound
8. degree of association with FILE—Outbound
9. degree of association with DB—Outbound
10. degree of association with SCREEN—Outbound
11. is DATE
12. is Numeric
13. is Signed
14. is Decimal
15. is Decimal with 2 points
16. is Decimal with greater than 2 points
17. is Alphanumeric
18. is Range
19. is impacted by DATE variable
20. is impacted by NUMERIC variable
21. is impacted by SIGNED NUMERIC variable
22. is impacted by DECIMAL variable
23. is impacted by DECIMAL with 2 points
24. is impacted by DECIMAL with greater than 2 points
25. is impacted by ALPHANUMERIC
26. is Impacted by variable with RANGE values
27. is redefined
28. is an array variable
29. is file
30. is dbvar
31. is screenvar
32. is copybook var
33. is constant
34. degree of usage in condition scope
35. degree of usage in loop scope
36. degree of usage in root scope
37. degree of usage in nested condition scope (greater than 2 levels)
38. degree of usage in nested loop scope (greater than 2 levels)
39. degree of modification in condition scope
40. degree of modification in loop scope
41. degree of modification in root scope
42. degree of modification in nested condition scope (greater than 2 levels)
43. degree of modification in nested loop scope (greater than 2 levels)
44. degree of relational greater than comparisons
45. degree of relational less than comparisons
46. degree of relational greater than or equal to comparisons
47. degree of relational less than or equal to comparisons
48. degree of equality comparisons
49. degree of inequality comparisons
50. degree of usage in addition
51. degree of usage in subtraction
52. degree of usage in multiplication
53. degree of usage in division
54. degree of modification in addition
55. degree of modification in subtraction
56. degree of modification in multiplication
57. degree of modification in division
58. degree of usage as call parameters
59. degree of assignment with distinct hard coded values
60. is impacted by DATE HARD CODED value
61. is impacted by NUMERIC values
62. is impacted by SIGNED NUMERIC values
63. is impacted by DECIMAL values
64. is impacted by DECIMAL with 2 points
65. is impacted by DECIMAL with greater than 2 points
66. is impacted by ALPHANUMERIC
67. is Impacted by RANGE values
68. is compared with (equals) DATE HARD CODED value
69. is compared with (equals) NUMERIC values
70. is compared with (equals) SIGNED NUMERIC values
71. is compared with (equals) DECIMAL values
72. is compared with (equals) DECIMAL with 2 points
73. is compared with (equals) DECIMAL with greater than 2 points
74. is compared with (equals) ALPHANUMERIC
75. is compared with (equals) RANGE values
76. is compared with (not equals) DATE HARD CODED value
77. is compared with (not equals) NUMERIC values
78. is compared with (not equals) SIGNED NUMERIC values
79. is compared with (not equals) DECIMAL values
80. is compared with (not equals) DECIMAL with 2 points 81. is compared with (not equals) DECIMAL with greater than 2 points
82. is compared with (not equals) ALPHANUMERIC
83. is compared with (not equals) RANGE values
84. is compared with (greater than or equal to) DATE HARD CODED value
85. is compared with (greater than or equal to) NUMERIC values
86. is compared with (greater than or equal to) SIGNED NUMERIC values
87. is compared with (greater than or equal to) DECIMAL values
88. is compared with (greater than or equal to) DECIMAL with 2 points
89. is compared with (greater than or equal to) DECIMAL with greater than; 2 points
90. is compared with (greater than or equal to) ALPHANUMERIC
91. is compared with (greater than or equal to) RANGE values
92. is compared with (greater than) DATE HARD CODED value
93. is compared with (greater than) NUMERIC values
94. is compared with (greater than) SIGNED NUMERIC values
95. is compared with (greater than) DECIMAL values
96. is compared with (greater than) DECIMAL with 2 points
97. is compared with (greater than) DECIMAL with greater than 2 points
98. is compared with (greater than) ALPHANUMERIC
99. is compared with (greater than) RANGE values
100. is compared with (lesser than or equal to) DATE HARD CODED value
101. is compared with (lesser than or equal to) NUMERIC values
102. is compared with (lesser than or equal to) SIGNED NUMERIC values
103. is compared with (lesser than or equal to) DECIMAL values
104. is compared with (lesser than or equal to) DECIMAL with 2 points
105. is compared with (lesser than or equal to) DECIMAL with greater than 2 points
106. is compared with (lesser than or equal to) ALPHANUMERIC
107. is compared with (lesser than or equal to) RANGE values
108. is compared with (lesser than) DATE HARD CODED value
109. is compared with (lesser than) NUMERIC values
110. is compared with (lesser than) SIGNED NUMERIC values
111. is compared with (lesser than) DECIMAL values
112. is compared with (lesser than) DECIMAL with 2 points
113. is compared with (lesser than) DECIMAL with greater than 2 points
114. is compared with (lesser than) ALPHANUMERIC
115. is compared with (lesser than) RANGE values
116. degree of usage in hard coded addition
117. degree of usage in hard coded subtraction
118. degree of usage in hard coded multiplication
119. degree of usage in hard coded division
120. degree of how many statements/variables are affected because of this variable Based on the metrics from the above 120 parameters, the decision on the current variable will be predicted.

In the acronym identification and expansion method, a combination of various acronyms and the corresponding expansions that are widely used during the naming of the variables are utilized. This requires a large repository of learning that are specific to domains. For example, ATM: Asynchronous Teller Machine, EOF: End of File.

In the random generator method, the logic is only applicable for terms that are not resolved through the above various algorithms. This is also neural network (NN) model which generates other variations of the abbreviations for the words. For example, AMOUNT1: AMT, TRANSACTION: TRN.

According to an embodiment of the disclosure the system 100 comprises the co-occurrence resolution unit 118. The co-occurrence unit 118 is configured to perform a co-occurrence resolution of the plurality of suggested terms to check whether the plurality of suggested terms make sense in the program code, wherein the co-occurrence resolution results in the generation of one or more expansions of the terms. The co-occurrence resolution is done on the resolution of each sub-term. The previous set of models used in multi-model based abbreviation resolution provide the resolution of each term of the variable and provides multiple expansion suggestions. For a particular term, this again needs to be grouped together to check the co-occurrence resolution and whether the initial expansions make any sense when linked with co-occurring terms.

According to an embodiment of the disclosure, the system 100 also comprises the conflict resolution unit 120. The conflict resolution unit 120 is configured to perform a conflict resolution if there are more than one expansion of the terms, to identify meaningful term of the abbreviation of the variable name according to a current context. In case of multiple expansion conflicts, this block helps in the resolution of the same to identify the best suited expansion according to the current context. For example, EXP-DT can be expanded as EXPIRY DATE and also EXPORT DATA. The context of the current term and also the co-occurring terms in the domain is considered and the appropriate expansion for the term is retrieved. When there are multiple expansions to a set of terms, this is termed as a Conflict. There are three approaches that can be used to resolve the conflict:

Approach 1: Trained models on the domains specifically insurance, retail, banking etc. The word2vec models on the given trained domains give a vector space of the words individually and then the distance is calculated between words. In the present example, Expiry and Date in the domain specific word vector space. If the distance between (Expiry and Date) and (Export and Data) found, then the one which is the least distant is chosen as the expansion from the term EXP-DT.

Approach 2: Keyword Extraction Logic have been used to make Co-occurrence model according to which the words occurring together have higher probability to come together than other words. So, this metric is used as well to determine if the conflict can be resolved. For example, "Production date" occurring together in the given source code, source code comments or documentation will help to determine if an abbreviation of the form "Prod-Dt" not yield with an erroneous "Producer-Data" but "Production date" instead.

Approach 3: A custom windowing logic have also been developed based on words Co-occurring together to go through the corpus to determine words occurring together and assigning probability to the words that are to be expanded. The size of the window can be assigned as required and seemed to fit the scenario in the best way for the user.

A combination of the above methods helps in conflict resolution. If, however, the user is not satisfied with the outcome of the model, the abbreviation to the terms can be manually assigned according to the preference of the user which would be the first method to resolve the abbreviation. Example (NUM→NUMERICAL) instead of (NUM→NUMBER).

According to an embodiment of the disclosure, if the system is not able to resolve this, both {all possible} information is provided to the end user to accept feedback. This feedback is in turn saved and processed for future conflict resolutions. The output of this would be resolved expansion of the cryptic term with its corresponding explanation as per the application/domain context.

FIG. 3 illustrates an example flow chart of a method 300 for identifying meaningful terms in the domain context from the plurality of cryptic forms of the variable name in the program code, in accordance with an example embodiment of the present disclosure. The method 300 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

Initially at step 302, the program code is provided as an input, via the user interface 104. The program code comprises the plurality of cryptic forms of the variable name. In the next step 304, the variable name from the program code is extracted using the parsing technique. Use of any parsing technique is well within the scope of this disclosure. Further at step 306, the variable name is segmented into a major entity and a plurality of sub-entities using the plurality of segmentation techniques.

At step 308 of the method 300, the plurality of expansions of the major entity and the plurality of expansions of sub-entities of the variable name are extracted using the plurality of multi model based abbreviation expansion techniques. Further at step 310, the obtained plurality of expansions of the major entity and the plurality of sub-entities which are co-occurring in the program code is regrouped to obtain the plurality of suggestions of terms. In the next step at 312, the co-occurrence resolution of the plurality of suggested terms is performed to check whether the plurality of suggested terms make sense in the program code, wherein the co-occurrence resolution results in the generation of one or more expansions of the terms. And finally, at step 314, the conflict resolution is performed if there are more than one expansion of the terms, to identify meaningful term of the abbreviation of the variable name according to a current context.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosure herein addresses unresolved problem related to reverse engineering to understand code to identify meaningful terms. The embodiment thus provides the method and system for identifying meaningful terms in a domain context from a plurality of cryptic forms of a variable name in a program code.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for identifying meaningful terms in a domain context from a plurality of cryptic forms of a variable name in a program code, the method comprising:
   providing, via a user interface, the program code as an input, wherein the program code comprises the plurality of cryptic forms of the variable name, wherein the variable names are at least one of variable name segmentation, multi-model based abbreviation resolution, co-occurrence resolution model and conflict solution;
   extracting, via one or more hardware processors, the plurality of cryptic forms of the variable name from the program code using a parsing technique;
   segmenting, via the one or more hardware processors, the variable name into a major entity and a plurality of sub-entities using a plurality of segmentation techniques;
   obtaining, via the one or more hardware processors, a plurality of expansions of the major entity and the plurality of expansions of the plurality of sub-entities of the variable name using a plurality of multi-model based abbreviation expansion techniques, and each model of a plurality of machine learning models is designed to mimic behaviour of a developer when the each model creates a variable name for a specific requirement and wherein the multi-model based abbreviation resolution is performed based on one or more of the following methods:
   a syllable based abbreviation prediction,
   a first n term abbreviation,
   an insignificant character remover,
   a variable relations with other variables based prediction,
   an acronym identification and expansion, and
   a random generator, and
   in a first n term abbreviation method, a model is used as a feedforward neural network and determining value of n based on input and returning a variable abbreviation by using a supervised set of terms and abbreviation combination to find correct value of n and return a corresponding abbreviation and wherein in an insignificant character remover method, another model is used as used as a feedforward neural network and removing one or more insignificant characters in a word, the insignificant characters being one of vowels, and suffixed numbers;
   regrouping, via the one or more hardware processors, the obtained plurality of expansions of the major entity and the plurality of sub-entities which are co-occurring in the program code to obtain a plurality of suggestions of terms;
   performing, via the one or more hardware processors, a co-occurrence resolution of the plurality of suggestion of terms, wherein the co-occurrence resolution results in the generation of one or more expansions of the terms; and
   performing, via the one or more hardware processors, the conflict resolution when there are more than one expansion of the terms, to identify a meaningful term of the abbreviation of the variable name according to a current context.

2. The processor implemented method of claim 1, wherein the conflict resolution is performed using one of:
   (i) using a set of domain specific trained models and a word2vec model on trained domains give a vector space of the words individually and then the distance is calculated between words, for providing/generating the vector space of the words individually and calculating distance between words,
   (ii) using a co-occurrence model generated using keyword extraction logic according to which the entity occurring together have higher probability to come together than other words, and
   (iii) using a custom windowing logic developed based on words co-occurring together to go through a corpus to determine words occurring together and assigning probability to the words that are to be expanded.

3. The processor implemented method of claim 1, wherein abbreviation is manually assigned according to the preference of a user to decide the first method to resolve the abbreviation.

4. The processor implemented method of claim 1, wherein the segmentation is done based on hyphen, underscore, case of the term or using a word segmentation technique, wherein the word segmentation technique is based on the knowledge from mapping the variable names to variable based comments, version based comments, and overview based comments extracted from code.

5. A system for identifying meaningful terms in a domain context from a plurality of cryptic forms of a variable name in a program code, the system comprises:
   a user interface for receiving the program code as an input, wherein the program code comprises the plurality of cryptic forms of the variable name, wherein the variable names are at least one of variable name segmentation, multi-model based abbreviation resolution, co-occurrence resolution model and conflict resolution;
   one or more hardware processors;
   a memory in communication with the one or more hardware processors, wherein the one or more hardware processors are configured to execute programmed instructions stored in the memory, to:

extract the plurality of cryptic forms of the variable name from the program code using a parsing technique;

segment the variable name into a major entity and a plurality of sub-entities using a plurality of segmentation techniques;

obtain a plurality of expansions of the major entity and the plurality of expansions of the plurality of sub-entities of the variable name using a plurality of multi-model based abbreviation expansion techniques, and each model of a plurality of machine learning models is designed to mimic behaviour of a developer when the each model creates a variable name for a specific requirement and wherein the multi-model based abbreviation resolution is performed based on one or more of the following methods:

a syllable based abbreviation prediction, a first n term abbreviation, an insignificant character remover, a variable relations with other variables based prediction, an acronym identification and expansion, and a random generator; and in a first n term abbreviation method, a model is used as a feedforward neural network and determining value of n based on input and returning a variable abbreviation by using a supervised set of terms and abbreviation combination to find correct value of n and return a corresponding abbreviation and wherein in an insignificant character remover method, another model is used as used as a feedforward neural network and removing one or more insignificant characters in a word, the insignificant characters being one of vowels, and suffixed numbers;

regroup the obtained plurality of expansions of the major entity and the plurality of sub-entities which are co-occurring in the program code to obtain a plurality of suggestions of terms;

perform a co-occurrence resolution of the plurality of suggested terms, wherein the co-occurrence resolution results in the generation of one or more expansions of the terms; and perform the conflict resolution when there are more than one expansion of the terms, to identify a meaningful term of the abbreviation of the variable name according to a current context.

6. The system of claim 5, wherein the conflict resolution is performed using one of the following:

(i) using a set of domain specific trained models and a word2vec model on trained domains give a vector space of the words individually and then the distance is calculated between words, for providing/generating the vector space of the words individually and calculating distance between words, (ii) using a co-occurrence model generated using keyword extraction logic according to which the entity occurring together have higher probability to come together than other words, and (iii) using a custom windowing logic developed based on words co-occurring together to go through a corpus to determine words occurring together and assigning probability to the words that are to be expanded.

7. The system of claim 5 further configured to manually assign abbreviation to the terms according to the preference of a user to decide the first method to resolve the abbreviation.

8. One or more non-transitory machine-readable information storage mediums comprising one or more instructions which when executed by one or more hardware processors cause:

providing, via a user interface, program code as an input, wherein the program code comprises a plurality of cryptic forms of a variable name, wherein the variable names are at least one of variable name segmentation, multi-model based abbreviation resolution, co-occurrence resolution model and conflict resolution;

extracting, the plurality of cryptic forms of the variable name from the program code using a parsing technique;

segmenting, via the one or more hardware processors, the variable name into a major entity and a plurality of sub-entities using a plurality of segmentation techniques;

obtaining, via the one or more hardware processors, a plurality of expansions of the major entity and the plurality of expansions of the plurality of sub-entities of the variable name using a plurality of multi-model based abbreviation expansion techniques and each model of a plurality of machine learning models is designed to mimic behaviour of a developer when the each model creates a variable name for a specific requirement and wherein the multi-model based abbreviation resolution is performed based on one or more of the following methods:

a syllable based abbreviation prediction, a first n term abbreviation, an insignificant character remover, a variable relations with other variables based prediction, an acronym identification and expansion, and a random generator; and in a first n term abbreviation method, a model is used as a feedforward neural network and determining value of n based on input and returning a variable abbreviation by using a supervised set of terms and abbreviation combination to find correct value of n and return a corresponding abbreviation and wherein in an insignificant character remover method, another model is used as used as a feedforward neural network and removing one or more insignificant characters in a word, the insignificant characters being one of vowels, and suffixed numbers;

regrouping, via the one or more hardware processors, the obtained plurality of expansions of the major entity and the plurality of sub-entities which are co-occurring in the program code to obtain a plurality of suggestions of terms;

performing, via the one or more hardware processors, a co-occurrence resolution of the plurality of suggestion of terms, wherein the co-occurrence resolution results in the generation of one or more expansions of the terms; and performing, via the one or more hardware processors, the conflict resolution when there are more than one expansion of the terms, to identify a meaningful term of the abbreviation of the variable name according to a current context.

* * * * *